United States Patent
Lubeck et al.

(10) Patent No.: US 7,609,654 B2
(45) Date of Patent: Oct. 27, 2009

(54) METHOD OF EVALUATING NETWORK CONNECTIVITY BETWEEN NETWORK RESOURCES

(75) Inventors: Mark Lubeck, San Jose, CA (US); Naveen Kondapalli, San Jose, CA (US); Jagadeesh Kasaraneni, San Jose, CA (US)

(73) Assignee: MCDATA Corporation, Broomfield, CO (US)

( * ) Notice: Subject to any disclaimer, the term of this patent is extended or adjusted under 35 U.S.C. 154(b) by 623 days.

(21) Appl. No.: 11/171,578

(22) Filed: Jun. 29, 2005

(65) Prior Publication Data

US 2006/0004918 A1 Jan. 5, 2006

Related U.S. Application Data

(60) Provisional application No. 60/584,806, filed on Jul. 1, 2004.

(51) Int. Cl.
*H04J 1/16* (2006.01)
*H04L 12/56* (2006.01)

(52) U.S. Cl. .................. 370/254; 370/252; 370/419

(58) Field of Classification Search .............. 370/237, 370/238, 252, 386, 254, 419; 709/221, 223
See application file for complete search history.

(56) References Cited

U.S. PATENT DOCUMENTS

2005/0169056 A1* 8/2005 Berkman et al. ....... 365/185.22
2005/0193103 A1* 9/2005 Drabik .................... 709/221
2006/0178918 A1* 8/2006 Mikurak .................. 705/7

OTHER PUBLICATIONS

CNT Introduces New Generation Storage Networking Infrastructure, at http://web.archive.org/web/20050206034944/www.cnt.com/cnt/news/pr/2004/07-19-00, 3 pages, © 2003-2005, printed Jul. 19, 2006.
Cisco MDS 9000 Family of Multilayer Directors and Fabric Switches, at http://www.cisco.com/en/US/products/ps6446/prod_brochure0900aecd80355d56.html, 3 pages, © 1992-2005, printed Jul. 19, 2006.
Cisco MDS 9000 Family Networked Storage Solutions for Small and Medium-Sized Businesses—At-a-Glance, 2-page product brochure, © 1992-2005 Cisco Systems, Inc.
DStar: CNT Remains FICON Leader with UltraNet Multi-Service Director, at http://www.taborcommunications.com/dsstar/04/1109/109456.html, 2 pages, printed Jul. 19, 2006.
CD/9000 Channel Director—Product Detail by CNT, at http://web.archive.org/web/20050204044510/www.cnt.com/products/switching/cd9000, 2 pages, © 2003-2005, printed Jul. 19, 2006.
FC/9000 Fibre Channel/FICON Director—Product Detail by CNT, at http://web.archive.org/web/20050205081213/www.cnt.com/products/switching/fc9000, 3 pages, © 2003-2005, printed Jul. 19, 2006.
McData—Intrepid® 6140 Director, product brochure, 2 pages, © 2006 McData Corporation.
McData—Intrepid® 10000 Director, product brochure, 2 pages, © 2006 McData Corporation.

* cited by examiner

*Primary Examiner*—John Pezzlo
(74) *Attorney, Agent, or Firm*—Hensley, Kim & Holzer, LLC

(57) ABSTRACT

A method for managing a computer or communication network by obtaining connectivity configuration information from a plurality of networked devices; and, determining a network connectivity condition between any two of the plurality of networked devices.

22 Claims, 6 Drawing Sheets

| Label | Storage_Port | Host_Port_La... | Masked | Bound | Cabled | Zoned | Visible |
|---|---|---|---|---|---|---|---|
| Flare LUN 0 | A1 | 210000E08B... | No | Yes | No | No | |
| Flare LUN 0 | A0 | 210000E08B... | No | Yes | No | No | ←401 |
| Flare LUN 0 | A1 | 210000E08B... | No | Yes | No | No | |
| Flare LUN 0 | A0 | 210000E08B... | No | Yes | No | No | |
| Flare LUN 0 | A1 | 1000000C9... | No | Yes | No | No | |
| Flare LUN 0 | A0 | 1000000C9... | No | Yes | No | No | |
| Flare LUN 0 | A1 | 210000E08B... | No | Yes | No | No | ←401 |
| Flare LUN 0 | A0 | 210000E08B... | No | Yes | No | No | |
| Flare LUN 0 | A1 | 210000E08B... | No | Yes | No | No | |
| Flare LUN 0 | A0 | 1000000C9... | No | Yes | No | No | |
| Flare LUN 0 | A1 | 1000000C9... | No | Yes | No | No | |
| Flare LUN 0 | A0 | 100000173... | No | Yes | No | No | |
| Flare LUN 0 | A1 | 100000173... | No | Yes | No | No | |
| Flare LUN 0 | A0 | 1000000C9... | No | Yes | No | No | |
| Flare LUN 0 | A1 | 1000000C9... | No | Yes | No | No | |
| Flare LUN 0 | A0 | 1000000C9... | No | Yes | No | No | |
| Flare LUN 0 | A1 | 200000E069... | No | Yes | No | No | |
| Flare LUN 0 | A0 | 200000E069... | No | Yes | No | No | |

Fig. 4

METHOD OF EVALUATING NETWORK CONNECTIVITY BETWEEN NETWORK RESOURCES

RELATED APPLICATIONS

This application claims priority of U.S. Provisional Application No. 60/584,806, entitled "Cross-network Connectivity Tables" and filed on Jul. 1, 2004, specifically incorporated herein for all that is discloses and teaches.

TECHNICAL FIELD

The present invention relates, in general, to network management, and, more particularly, to software, data structures, systems and methods for evaluating connectivity in computer or communication networks such as storage area networks.

BACKGROUND

Computer data storage systems have grown from direct-attached storage, where one or more disk drives are coupled to a system bus, to the more recently developed, higher capacity network-attached storage and storage area network technologies. Such greater capacity systems also present higher reliability, and higher availability. Moreover, storage area networks or "SANs" provide infrastructure on which sophisticated storage solutions can be built. Benefits include the ability to share a large storage device across many servers or applications, as well as the ability to create arrays of multiple physical storage devices to present large storage capacities (e.g., terabytes). In such systems, host computers (e.g., servers) couple to the physical storage devices via networks or fabrics that may include one or more switches. Each switch may implement a plurality of ports, some of which provide for connection to one or more host computers and others of which provide connections to the storage devices.

A large physical storage capacity is often difficult to use efficiently. Configuring, maintaining, and backing up large storage volumes can be time-consuming. Also, it can be difficult to integrate large storage volumes into RAID arrays to obtain improved availability and reliability. To improve sharing such a large storage capacity amongst many host computers and processes, the storage is typically segregated into smaller pieces called logical units, which are then assigned to one or more host computers.

SANs can be complex systems with many interconnected computers, switches and storage devices, and this complexity can make it difficult for SAN administrators to troubleshoot a problem, particularly where the problem occurs as a connectivity issue, whether in or to the host computers, the switches, the storage devices themselves, or in or to the ports of the host computers, storage devices and/or the switching fabric, or in any of the physical interconnections therebetween, amongst other possible sources of error. Thus, a benefit may accrue to SAN administrators upon the provision of a simplified way to confirm connectivity across a network, and to isolate the reason or reasons for a particular connectivity failure if they find a lack of connectivity. Physical connections and the configurations of multiple devices can all contribute to a connectivity failure. The SAN administrator must determine which cause or causes are at fault on the many possible paths between one side of the network and the other. In addition, SAN administrators may select appropriate objects (e.g., host computers, switch ports and storage devices) to connect to each other. The more a SAN administrator knows about the state of the network, and the possible paths between end objects, the easier it is to select objects that will require a minimum of effort to connect successfully. And additionally, to maintain security of the data and optimal performance of the network, the administrator must prevent unauthorized or unintended connectivity, or eliminate such connectivity if it can be detected.

In the past, SAN administrators have had to physically inspect the end-to-end cable paths and then invoke multiple software applications to record and view the configurations on multiple devices to determine the cause or causes of a connectivity failure. This has involved steps of reviewing multiple event logs, and/or maintaining complicated spreadsheets to try to isolate the source of a problem. This work is especially time consuming if there really is no network connectivity problem and the network administrator is called upon to "prove a negative," by showing that there are no failures or wrong configurations in the network. Network administrators have also used spreadsheets to maintain relevant pieces of data, often on separate sheets, to determine which objects are the best candidates for connection. Only partial, or very cumbersome solutions, particularly in the form of a system, software and/or methods for software, data structures and/or systems for confirming connectivity in storage area network are currently available.

SUMMARY

Implementations described and claimed herein address the foregoing problems by providing methods and systems, which provide improvements in the evaluation or management of the connectivity of computer or communication network systems. Briefly stated, the present invention involves a method for evaluating a network connectivity condition by obtaining device configuration information, and determining whether the device configuration information fulfills a network connectivity condition between at least two resources.

In some implementations, articles of manufacture are provided as computer program products. One implementation of a computer program product provides a computer program storage medium readable by a computer system and encoding a computer program. Another implementation of a computer program product may be provided in a computer data signal embodied in a carrier wave or other communication media by a computing system and encoding the computer program.

Other implementations are also described and recited herein.

BRIEF DESCRIPTION OF THE DRAWINGS

In the drawings:

FIG. 4 is a view of another user interface in accordance with the technology hereof;

DETAILED DESCRIPTION

The specific implementations described herein are examples only, and not limitations of the claimed subject matter. For example, network connectivity is described herein in some implementations using fibre channel technologies and fibre channel architecture, however, other network technologies and/or architectures may provide suitable functionalities in particular environments. Alternative examples include iSCSI (Internet Small Computer System Interface), Internet protocol (IP) and FICON, inter alia. Similarly, in some implementations, e.g., fibre channel or iSCSI, storage capacity is here presented as logical units, identified by logical unit numbers (LUNs), although the protocol may readily be varied to meet a particular application.

Figure 1:
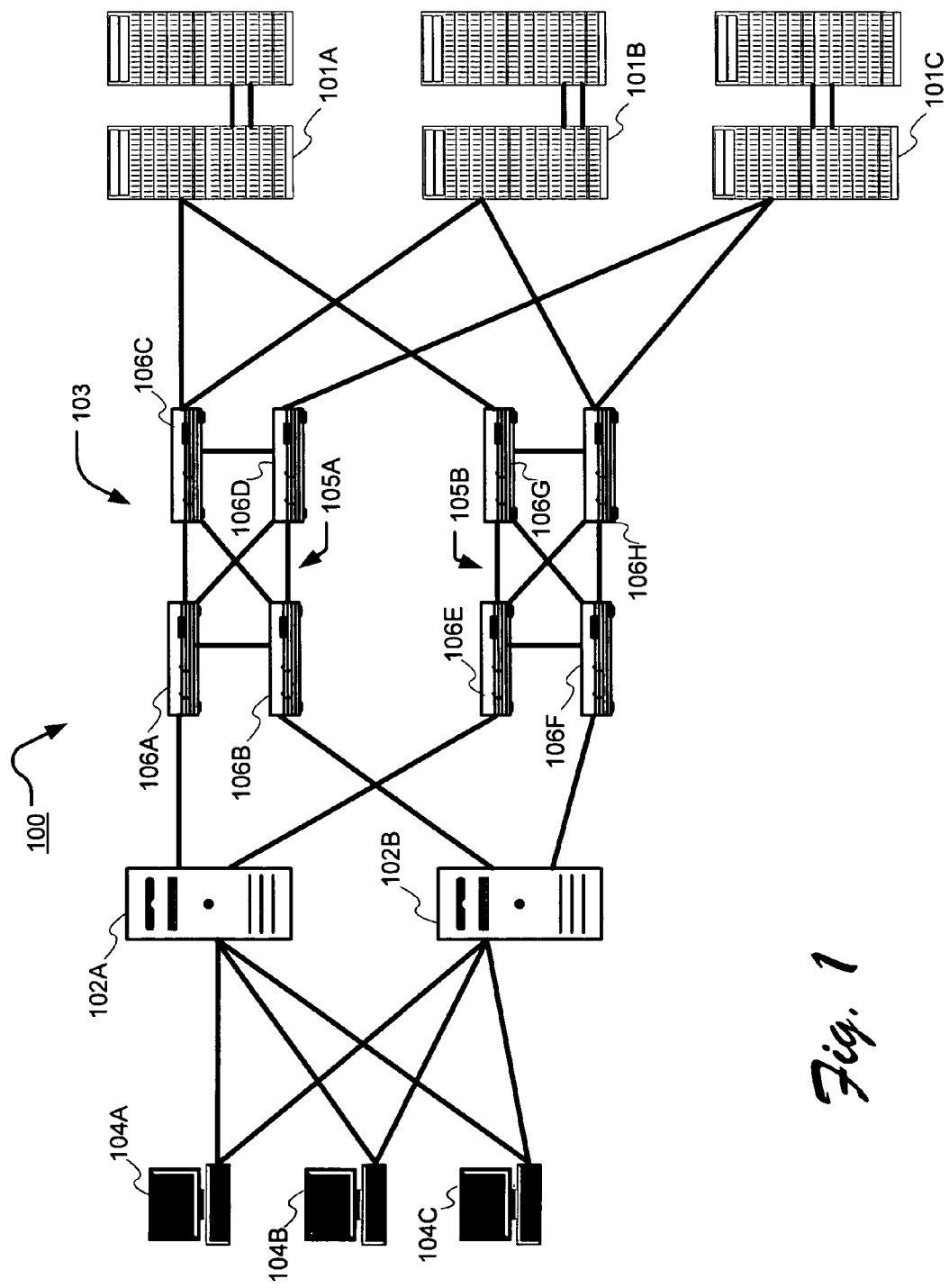
FIG. 1 is a schematic view of a storage area network (SAN) environment.

FIG. 1 illustrates a general storage area network (SAN) 100 implementing features in accordance herewith. The example shown in FIG. 1 may be disposed in a single site, or may be dispersed in a multi-site application. The SAN 100 may include a number of networked devices, and, may include one or more storage arrays 101, such as storage arrays 101A, 101B and 101C shown here. The storage arrays may also be paired for redundancy as shown here also. Any number of storage arrays 101 may be included in any site and/or in any particular SAN. The storage arrays 101 may include any of many types of physical storage devices, such as hard disk drives, tape drives, optical drives, and the like. The storage implemented at various sites is accessed by a host computer or server 102, hereafter collectively referred to as "hosts," such as hosts 102A and 102B. Host computers are generally machines that themselves require data storage or provide linkage via a local area network to end-users or application clients 104 (see end-users/clients 104A, 104B and 104C) which require storage. Typical hosts 102 such as mainframes, web servers, transaction processors, and the like may demand large quantities of storage. However, a host computer 102 may comprise a computer of any processing capacity that requires or benefits from network storage either to reduce cost of the host 102, implement more storage capacity than practical in a host 102, share data amongst multiple hosts 102, or the like.

Generally, a host 102 may couple to one or more storage arrays 101 via a connection or multiple connections to a data communication network 103. Storage arrays 101 may each implement a quantity of data storage capacity that is accessible through and controllable by storage controllers disposed within each storage array 101, the storage controllers (not separately shown) having one or more connections or ports to the network 103. Storage arrays 101 may typically implement hundreds of gigabytes to terabytes of physical storage capacity that may be carved into a plurality of logical units each being identified by an assigned logical unit number or LUN. The LUNs implement an arbitrary, pre-assigned quantity of logical block address storage, and each LUN may have a specified level of data protection such as RAID 0-5 data protection. Hosts 102 access physical storage capacity by having read and write operations addressed to specified LUNs, and can be otherwise unaware of the physical storage architecture or data protection strategy for a particular LUN that is being accessed. The storage controllers of the storage arrays 101 manage the tasks of configuring and/or allocating physical storage capacity to specified LUNs, monitoring and maintaining integrity of the LUNs, moving data between physical storage devices, and other functions that maintain integrity and availability of the data stored therein. The storage arrays 101 are programmable to control the addressing and accessing of data from and by particular hosts 102.

Network 103 may include any of a variety of available networks, and may include a plurality of interconnected networks. In particular examples, network 103 may include at least two independent fibre channel fabrics 105, see fabrics 105A and 105B in FIG. 1, to provide redundancy. These fibre channel fabrics may include long-distance connection mechanism (not shown) such as asynchronous transfer mode (ATM) and Internet protocol (IP) connections that enable sites to be separated by arbitrary distances. The fabrics 105 may be made from a number of switches 106, see switches 106A, 106B, 106C and 106D in fabric 105A and switches 106E, 106F, 106G and 106H in fabric 105B. As shown in FIG. 1, the various switches may be connected in redundant manners to ensure that if any particular connection between switches is not active for any reason, then a redundant path may be provided via the other connections and/or other switches.

Figure 2:
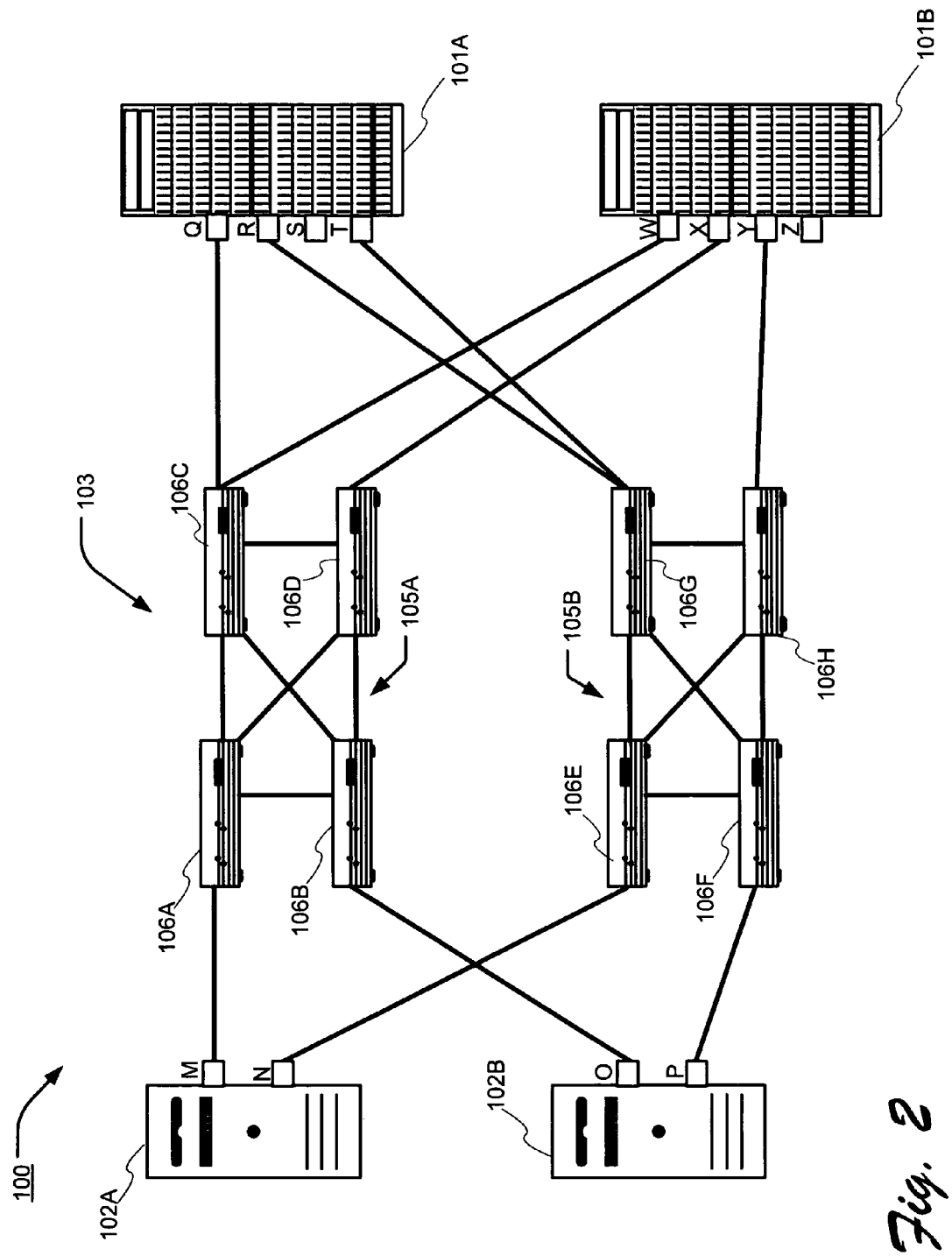
FIG. 2 is a further schematic view of at least a portion of a storage area network (SAN) environment.

FIG. 2 shows a further detailed view of an exemplar SAN 100 with more specificity of connectivity. For example host 102A is shown having two ports M and N which are each respectively connected to the fabrics 105A and 105B; port M to fabric 105A and port N to fabric 105B. Host 102B, with respective ports O and P, is shown where each port is similarly connected into the respective fabrics 105A and 105B; port O to fabric 105A and port P to fabric 105B. On the other side of the fabrics 105A and 105B are the representative storage arrays 101A and 101B, which are shown having four ports apiece (fewer or more ports may be available per storage array depending upon the storage array). Storage array 101A has ports Q, R, S, and T where array 101B has ports W, X, Y and Z. The storage arrays are then shown connected to the fabrics of the storage area network via one or more of the respective ports. Here for example only, storage array 101A is shown connected via only port Q to fabric 105A, and to fabric 105B via only ports R and T (port S is not connected to the network at all in this example). Similarly, storage array 101B is shown connected via only ports W and X to fabric 105A and by port Y only to fabric 105B (port Z remains unconnected in this example). In a port to port connectivity system, it can be seen that respective ports M and O of corresponding hosts 102A and 102B are thus connected by any of various paths through the variety of switches in the fabrics 105 to port Q of array 101A and to any of ports W and X of array 101B. Ports N and P are similarly limited in their ultimate connectivity such that they are only physically connected to port Y of array 101B and only to ports R and T of storage array 101A. This physical connectivity is determinable in one implementation hereof as described further below. Note, the connectivity shown in FIG. 2 is an exemplar for use in description only; it is not intended to demonstrate common connectivity conditions. Note further that though this example is representative of a Fibre Channel connectivity scheme in a SAN, other unshown connectivity relationships may be found with other protocols and/or with other networks, as for example, potentially including multiple connections to a particular single host or storage array port.

Connectivity conditions may be viewed on a further detailed basis, and for such it may be useful to consider that each of the entities which communicate with one or more other entities require at least one connectivity segment for completion of a communication. These entities or resources may include for example, the ports on either the storage arrays 101 or the hosts 102, or may include switch ports (not separately shown) or the switches 106 themselves. Moreover, the resources may include the LUNs, resident in the storage arrays 101, and/or may include any applications in the hosts 102 (similar hardware and/or software in the switches or other hardware items may in some cases also be separately identified as resources, though not separately discussed here). Then, a resource-to-resource communication may be tracked, as for example, from an application resource resident in a host first to port resource on that host. Communication may be tracked then from that port resource to a switch resource, and from there to a storage array port, which then ultimately communicates with a LUN resource resident in the storage array. Tracking can take place in reverse of this as well, and/or may be limited to view of one or more of the various segments. The communication line from resource to resource may be referred to herein as a segment, as in a segment or portion of the network path. In FIG. 2, a communication line is shown disposed from port M of host 102A to the port of switch 106A; this communication line is an exemplar segment between resources.

Next however, returning briefly to FIG. 1, in an implementation hereof, at least one SAN management tool, whether by software and/or by appliance may be used to fulfill methodology and/or system technology shown and described herein. As shown in FIG. 1 such a tool may be implemented as or within a storage array 101, a host 102, a client 104 or a switch 106, or a completely separate appliance, any of which being coupled to network 103, i.e., communicating through any means (inband or independent or otherwise out of band, e.g., where the network may be fiber channel for example, and a separate appliance is connected to one or more or all of the network devices by IP as an example) to a networked device or devices. In practice, the SAN management tool may often be situated in a form such as one or more of the clients 104, and will be referred to hereafter as tool 104C, a particular one of the clients 104. In general however, the tool may be connected to the network via the cabling in place for the other networked devices, or in other implementations, the tool may be separately connected to each of the networked devices in which it is interested. Indeed, the tool may be connected via fibre channel or iSCSI or other protocols in the same fashion as the other networked devices, or the tool may be separately connected to one or more or each of the other networked devices via the same protocol or perhaps even a separate discrete protocol such as an IP protocol. Note, either one or a number of tools may be provided. However, because each tool communicates through either network 103 or separate connections (not shown), the physical location of the tool(s) may be relatively arbitrary. Such tools may also be implemented to provide redundant connections to the storage arrays 101.

Information about connections, connectivity, functionality and other state information about the SAN is configured in and maintained by the various networked devices and applications implemented on various of such devices including the storage arrays 101, the host computers 102, the switches 106 and/or other potential devices (not shown) within network 103. This information is also referred to herein as device configuration information, and it may also include what may be more specific resource configuration information (e.g., as in port configuration information on the hosts or storage arrays). It may also be that the SAN management tool, whether tool 104C or otherwise, as well as other devices, applications and systems may have interesting configuration information also. The methodology and/or systems hereof may operate to gather data from these multiple devices and applications and provide analysis hereof and/or may present the user with connectivity implications thereof including in some implementations one or more of the following resource configuration information:

Physical cabling
Physical and logical Port Status, including
    Logical switch Port Blocking
Physical Errors or Failures
Logical Security Settings, including
    Enterprise Fabric Mode
    Fabric Binding
    Switch Binding
    Port Binding
    Device Authentication
Logical switch Zoning
Logical LUN Masking
Logical LUN Binding
Logical File System Mounting
Logical Host Login To Storage
Actual Physical In-Band Visibility, and/or
Other relevant data.

In some implementations, the LUN Masking and LUN Binding information is configured in and maintained in the storage arrays 101, while the zoning and cabling information is configured in and maintained in the switches 106. Thus, the querying or interrogating of the networked devices may want to include obtaining this information from at least the storage arrays 101 and the switches 106 (note, though the tool 104C is not shown separately connected (not separately shown) to each and every device therein, it may not be necessary for these queries, even if it may be preferable to do so for ensuring obtaining discovery of all of this information). The hosts 102 may also have interesting information configured therein as for example including visibility and mounting information (see below).

Figure 3:
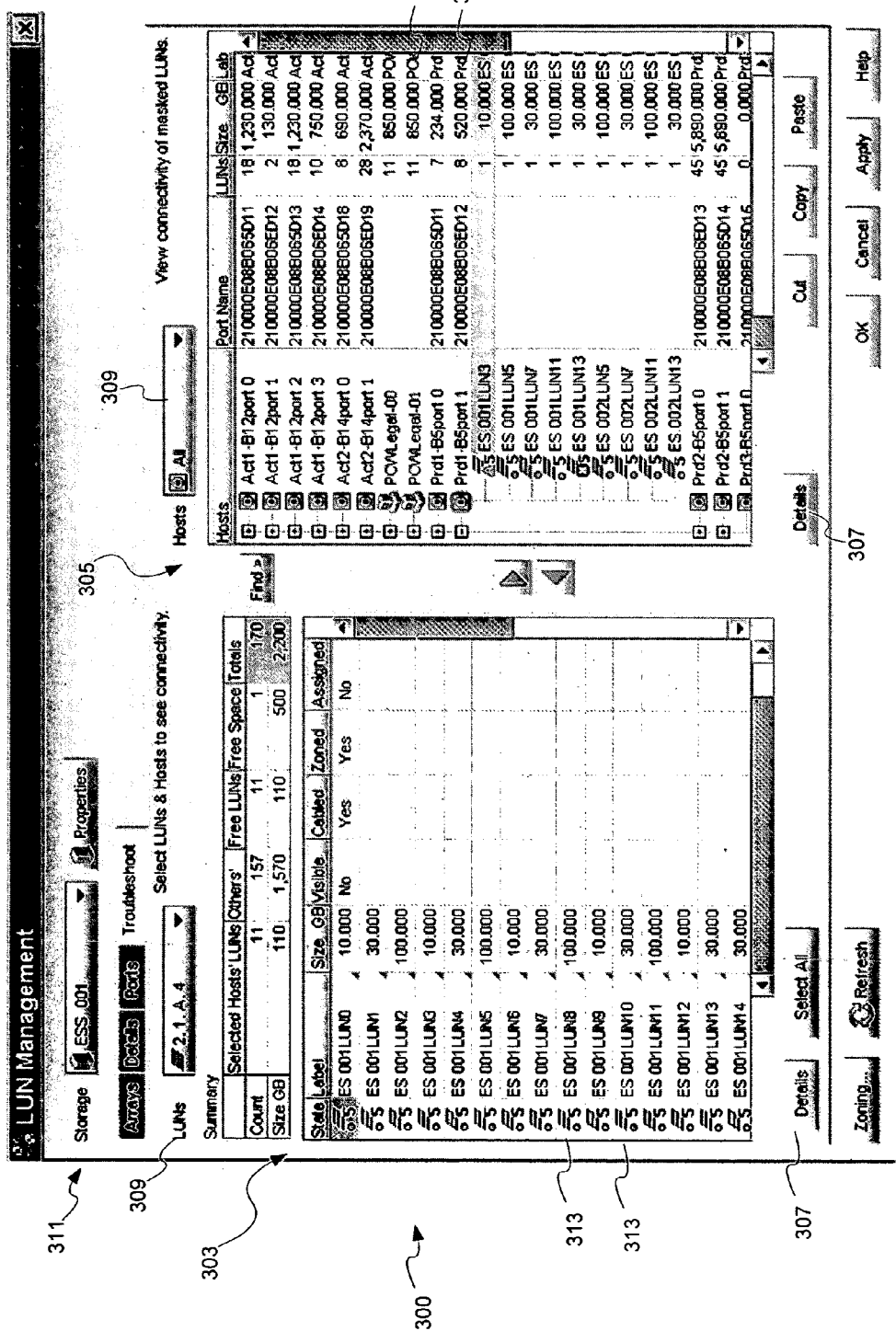
FIG. 3 is a view of a user interface in accordance with the technology described herein.

This data may be either or both, analyzed for determination of a connectivity conclusion, and/or presented in a user interface 300 as shown in FIG. 3 in a manner that presents both sides (e.g., a LUN side and a Host side) for simplified troubleshooting analysis. For any Host/LUN combinations, the methodology and/or system hereof may provide an "additional details" table 400 as shown in FIG. 4 that provides a similar analysis for every possible path between the two end objects. There are three main problems solved: first, greatly reduced are the time and effort required to confirm connectivity across a network, or disconfirm it and isolate the cause. Second, greatly reduced also are the time and effort required to select an appropriate candidate object that will require the minimum number of actions to complete connectivity across a network. Third, this display makes it not only possible, but also quick and easy to find many cases of connectivity where it was not intended.

An implementation of a user interface 300 is shown in FIG. 3 and presents network entities and shows which objects have been discovered and are associated with and/or connected with each other, or in some implementations which are available to be associated with and/or connected with each other. The user interface 300 includes a LUNs table 303 on the left hand side of user interface 300 and a Hosts table 305 on the right hand side of user interface 300. In this particular implementation, a user may operate control 311 to select a particular physical storage device (e.g., ESS 001 in the example of FIG. 3). Each row 313 corresponds to a logical network entity such as a LUN (e.g., ESS001LUN0 through ESS001LUN14 in the example of FIG. 3). Each row may present selected information about the object such as is presented in the columns labeled "State" and "Size". In the example of FIG. 3, the state column indicates the type of data protection provided by that LUN (e.g., RAID level) and is color coded to indicate status of that LUN as online and functioning normally, online but down temporarily, offline or faulted, or unknown status.

Host table 305 may contain an entry 323 for each of the objects on the host side of the network. Each entry 323 may contain some basic properties of the object, and columns for substantially the same connectivity elements or conditions listed in the LUN table 303. Host table 305 is constructed as a tree table in that an entry 323 may be expanded by clicking on the "+" control so as to display components associated with that entry. As shown in FIG. 3, the host port labeled "Prd1-B5port1" associated with a host named "Prd1-B5" is associated with nine LUNS.

For each row 313 there is a series of columns that display the various configurations and elements, also referred to herein as connectivity conditions that must be in place to support connectivity. For example, in FIG. 3 the LUN table 303 (and table 305 as describe below) includes columns labeled "Masked", "Bound", "Cabled", "Zoned", "Visible", and "Assigned" as well as any number of additional columns that would be visible by scrolling right. Some of this state information may be retrieved from pre-assembled configuration data sources and/or configuration information stored in the various SAN objects such as hosts, switches, port modules, storage devices, their firmware, management software and the like. SAN devices often include monitoring and discovery processes that routinely gather information about connectivity and other SAN state information that is relevant to their own operation and store that state information in local data structures. It is also contemplated that the methodologies and/or systems hereof may initiate these discovery processes, sometimes referred to as instrumentation processes, to dynamically gather this information. The meaning associated with each of these columns is:

Masked—Represents whether the selected LUN is masked to which of the selected host ports. Within each of the storage arrays, the storage is defined in parts, sometimes referred to as logical units, each such unit having an assigned identifying number. LUN Masking is a configuration which may be represented in a form of a list or table or the like (usually maintained in the storage array) which keeps track of which LUNs have been configured, i.e., identified/defined as allowed to communicate with particular Host ports. LUN masking is used to assign appropriately sized pieces of storage from a common storage pool to respective hosts/servers. LUN masking allows for large storage devices to have the storage capacity thereof divided into more manageable pieces. LUN masking also allows reasonably sized file systems to be built across many physical storage devices to improve performance and reliability, and it is oftentimes part of the fail-over process when a component in the storage path fails. LUN masking is also one of many possible security features that help determine who may and who may not access a LUN."

Bound—Represents whether the storage array ports for accessing this LUN from these hosts are defined. The LUNs within the storage arrays may also be pre-defined to or be limited in their respective communications through respective storage array ports (to balance loads or traffic). Thus, like LUN Masking, LUN Binding may be a configuration in the form of a list or table or the like (again usually maintained in the storage array) keeping track of the LUN to storage array port definitions.

Cabled—Represents whether there is any physical connection between any storage port and any or all of the selected host ports. This again is switch maintained data of the physical connections to the switch, and thus from the switch to which particular host and storage array ports. Note, the concept of a physical connection between any particular resources may be hardwire cabling in the conventional sense, or may also alternatively include wireless connections between any two resources. Thus, a connectivity condition hereof may include link state information indicating a wireless connection between any two resources. References to cabled or cabling herein are thus also generally intended to include the alternative of wireless connections.

Zoned—Represents whether there are any zones in the active zone set in the fabric (interconnected set of switches) connecting any storage port and any and/or all of the selected host ports. This is a configuration determination of which storage array ports are defined to be allowed to communicate with which host ports, port to port. The converse is also determinable herefrom, i.e., which storage ports are defined as not allowed to communicate with which host ports. Note, the term "zone" and/or "zoned" has been used with this definition particularly related to storage area network technologies; however the concept of "domaining" in Internet protocol (IP) has substantially the same meaning. Thus, hereafter use of the word "zone" or a variant thereof is intended to encompass "domaining" throughout this description as well as the claims appended hereto.

Visible—Represents whether the storage manager has an in-band view of the storage device from all of the selected hosts. Can the storage manager send and receive an iSCSI inquiry between all of the selected hosts and the selected LUN? This is the information on the connectivity as viewed from the host.

Storage Ports—Lists comma-separated values for all the bound storage ports.

Mounted—Represents whether the selected LUN is mounted to the operating system (OS) file system on the host server, i.e., does the host software, often a file system of an operating system, recognize or have defined a communication with a particular LUN.

Then, the value presented in each cell of the table (see FIGS. 3 and 4) is a result of the analysis of answering the question: Is this element in place to allow connectivity between this tree node and this associated object? In the particular example, for each cell in the table one of the following four values is presented:

Yes—This element is configured for connectivity

No—This element is not configured for connectivity

* Yes—(Conditional Yes) This element is configured for connectivity but not on the same path as other required configuration elements.

* No—(Conditional No) This element is not configured for connectivity, yet connectivity has been verified.

If zoning=yes and cabled=yes but not on the same storage port then zoning=conditional yes and cabled=conditional yes.

If zoning=yes and cabled=yes and masked=yes and visible=no then visible=conditional no.

The conditional yes and conditional no values are appropriate when an obvious error condition is detected or if the data is correct but potentially misleading. In a particular implementation the color of the text may be made to change to red (or some other warning color). Three analytical examples follow.

In a first example, consider a situation in which the storage device's assignment table indicates that LUN0 (labeled ES001LUN0 in FIG. 3) is not assigned to host port "Prd1-B5port 1". But for some reason LUN0 is "Visible" to the host port. In such a case the Visible column in the row labeled "ES001LUN0" would read "yes" rather than "no" as illustrated in FIG. 3. This is an obvious error. In response to identifying this error, the methodologies and/or systems hereof may present the information in the Visible column in red preceded by an asterisk and a space: * Yes to indicate the conditional Yes. Significantly, technology hereof may allow state information from multiple sources to be gathered and compared. In many cases the source of the LUN:host assignment information is not aware of the source of the information indicating that a LUN is actually visible to the host port. The methodologies and/or systems hereof may thus allow this information from disparate sources to be analyzed in the aggregate to make better-informed decisions for the user.

As another example, LUN 13 has been assigned to the host port but is not visible. This is an obvious error. So the text in the Visible column is changed to * No to indicate the conditional No.

As another example, LUN 4 has values of "Yes" for Bound, Cabled and Zoned. But the existing zone does not match the path that is actually cabled, and neither path goes to the ports that are bound to the LUN. If the user assigns LUN 4 to the selected host port, he/she will not get data transfer. The Visible column will not say Yes, even though the all the other values are Yes. To alert the user to this situation, the values in the Bound, Cabled and Zoned columns are all *Yes (conditional Yes). This indicates that there is a cable (or other physical connection) and a zone and binding that connects the LUN, its storage port(s), and/or host ports, but the configuration is not sufficient for data transfer.

Any time the five parameters (e.g., masked, bound, cabled, zoned, and visible are not logically consistent, the text in the "Visible" column, or one or more other column(s) should be flagged with an indication that the state presented in that column is conditional. In the particular examples, an asterisk and red color (or other highly indicative display means) may be used for this indication. When data is not available the corresponding field for that state information is left blank.

When multiple hosts are selected the methodologies and/or systems hereof may use AND logic for the columns. Only if Visible is Yes for all selected Host/LUN pairs will an unconditional "yes" be presented in the corresponding column. If it is No or Blank (Not Available) for any Host/LUN pair, a "No" or Blank is presented in the column. In a particular implementation, the connectivity values for all the assigned LUN/Hosts combinations in the Hosts table are determined when the user opens the tab. The connectivity values for only the selected LUNs/Hosts combinations in the LUNs table may be determined on demand when a user requests same, or may be determined automatically before or when the user opens the tab.

All other unselected Cabled, Zoned, Bound (or Host Connection), Masked, Visible cells in the LUNs table 303 will be blank. To compute values for other LUNs/Hosts combinations the user selects the objects of interest. The state information will be determined and presented upon a change of selection. The previously populated cells retain their data as long as there is valid data for the selected hosts. Although it is possible to compute all possibilities in advance and may be practical in smaller SANs, running all the possible combinations for thousands of LUNs and hundreds of hosts may consume a large amount of computing and network resources. Hence, an implementation hereof determines information only for user-selected variables.

In typical usage the user selects one or more of the objects (i.e., rows) in table 303 and one or more objects (i.e., rows) from table 305 in FIG. 3. The software application determines the connectivity values for each object set across the network. This determination may be performed by querying one or more databases or tables where the configuration and state information is maintained (see FIG. 1), or it may be obtained by actively testing the connectivity values in response to the user selection. In most cases SAN devices will include various types of instrumentation processes that periodically gather the connectivity information and store that in one or more databases, in which case the software application in accordance herewith will query those databases to determine the values that should be listed in each column entry. Thus, it may be that the functionality (methodology and/or system) may reside on a host 102, in a storage array 101 or otherwise within a network 100.

Upon changing the selection in either table or list, the application hereof may re-compute the connectivity values. If the user selects more than one item from table 303 or 305, then the computed value is the logical sum of all the objects in the set. That is, for a connectivity value in the left hand table 303 to be "Yes," that connectivity element must be in place between that object and all the objects selected in the right hand table 305.

Tables 303/305 optionally support convenience features such as column heading controls that allow the tables to be sorted by clicking on the column heading. This assists the user in identifying particular objects in what can be a sizeable list of objects. Also, filter controls 309 can be used to select ranges objects for display. For example, the filter control 309 labeled LUNs may be used to allow the user to specify a particular drive array so that only LUNs from that array are presented in table 303. Similarly, the filter control 309 labeled "Hosts" may allow the user to specify a particular host computer so that only ports associated with that host computer are presented in table 305.

Each of the tables 303/305 described above may support a Details view such as that shown in FIG. 4 that may be launched by clicking on one of the "Details" buttons 307. Selecting a set of objects from either table 303 or 305 and then selecting the details button 307 causes table 400 to be presented. Table 400 includes a row (see e.g., rows 401) for every possible path between the two sides of the network. In this way the user can display which of the possible paths actually support connectivity, or which are closest to supporting connectivity. It should be noted that the number of possible paths increases geometrically as the number of ports, switches, and physical links between ports and switches increases. Hence, the number of entries presented in the details user interface 400 can be quite large. User interface 400 optionally supports convenience features such as column heading controls that allow the tables to be sorted by clicking on the column heading. This may assist the user in identifying particular objects in what can be a sizeable list of objects.

Figure 5:
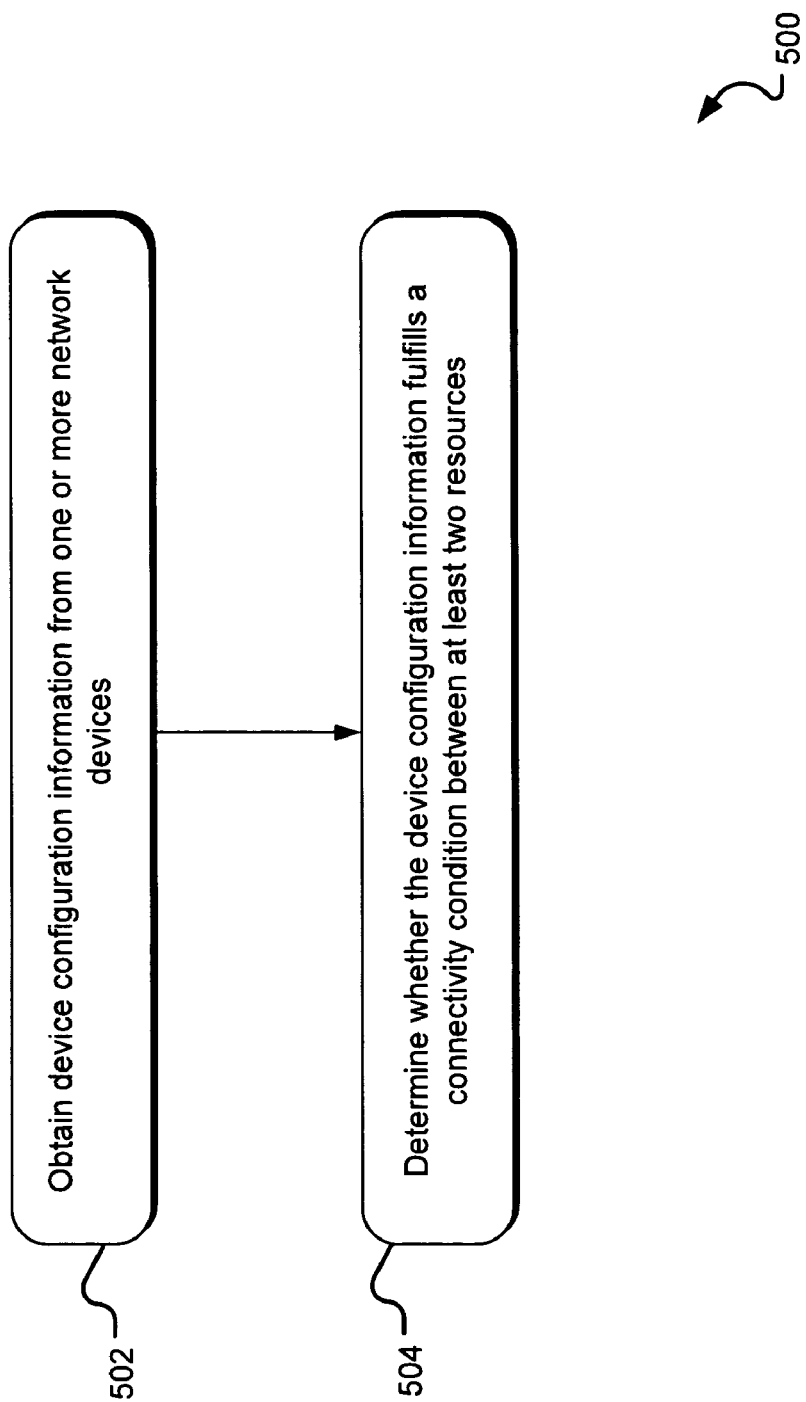
FIG. 5 illustrates exemplary operations for managing a storage area network; and, FIG. 6 illustrates an exemplary system useful in implementations of the described technology.

FIG. 5 illustrates exemplary operations 500 for managing a storage area network (SAN). An operation 502 for obtaining storage information may be performed. In an operation 504 for analyzing the storage information, the storage information may be analyzed for connectivity issues. Then, a determination operation 506 may be performed to establish a state of connectivity.

Figure 6:
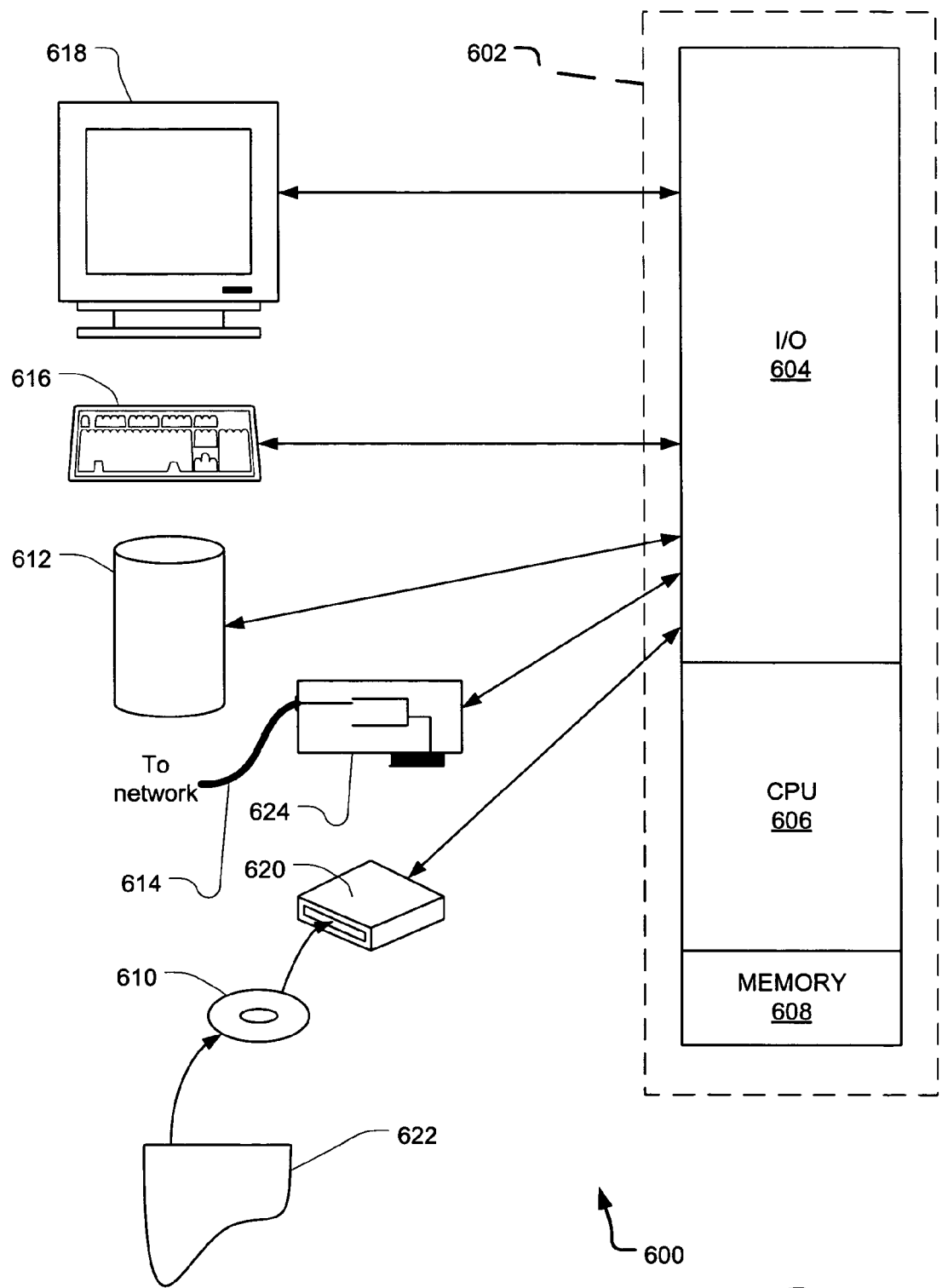

FIG. 6 illustrates an exemplary system useful in implementations of the described technology. A general-purpose computer system 600 is capable of executing a computer program product to execute a computer process. Data and program files may be input to the computer system 600, which reads the files and executes the programs therein. Some of the elements of a general-purpose computer system 600 are shown in FIG. 6 wherein a processor 602 is shown having an input/output (I/O) section 604, a Central Processing Unit (CPU) 606, and a memory section 608. There may be one or more processors 602, such that the processor 602 of the computer system 600 comprises a single central-processing unit 606, or a plurality of processing units, commonly referred to as a parallel processing environment. The computer system 600 may be a conventional computer, a distributed computer, or any other type of computer. The described technology is optionally implemented in software devices loaded in memory 608, stored on a configured DVD/CD-ROM 610 or storage unit 612, and/or communicated via a wired or wireless network link 614 on a carrier signal, thereby transforming the computer system 600 in FIG. 6 to a special purpose machine for implementing the described operations.

The I/O section 604 is connected to one or more user-interface devices (e.g., a keyboard 616 and a display unit 618), a disk storage unit 612, and a disk drive unit 620. Generally, in contemporary systems, the disk drive unit 620 is a DVD/CD-ROM drive unit capable of reading the DVD/CD-ROM medium 610, which typically contains programs and data 622. Computer program products containing mechanisms to effectuate the systems and methods in accordance with the described technology may reside in the memory section 604, on a disk storage unit 612, or on the DVD/CD-ROM medium 610 of such a system 600. Alternatively, a disk drive unit 620 may be replaced or supplemented by a floppy drive unit, a tape drive unit, or other storage medium drive unit. The network adapter 624 is capable of connecting the computer system to a network via the network link 614, through which the computer system can receive instructions and data embodied in a carrier wave. Examples of such systems include SPARC systems offered by Sun Microsystems, Inc., personal computers offered by Dell Corporation and by other manufacturers of Intel-compatible personal computers, PowerPC-based computing systems, ARM-based computing systems and other systems running a UNIX-based or other operating system. It should be understood that computing systems may also embody devices such as Personal Digital Assistants (PDAs), mobile phones, gaming consoles, set top boxes, etc.

When used in a LAN-networking environment, the computer system 600 is connected (by wired connection or wirelessly) to a local network through the network interface or adapter 624, which is one type of communications device. When used in a WAN-networking environment, the computer system 600 typically includes a modem, a network adapter, or any other type of communications device for establishing communications over the wide area network. In a networked environment, program modules depicted relative to the computer system 600 or portions thereof, may be stored in a remote memory storage device. It is appreciated that the network connections shown are exemplary and other means of and communications devices for establishing a communications link between the computers may be used.

In accordance with an implementation, software instructions and data directed toward creating and maintaining administration domains, enforcing configuration access control, effecting configuration access of SAN resources by a user, and other operations may reside on disk storage unit 612, disk drive unit 620 or other storage medium units coupled to the system. Said software instructions may also be executed by CPU 606.

The implementations described herein may be effectuated as logical steps in one or more computer systems. The logical operations hereof may be implemented (1) as a sequence of processor-implemented steps executing in one or more computer systems and (2) as interconnected machine or circuit modules within one or more computer systems. The implementation is a matter of choice, dependent on the performance requirements of the computer system implementing the invention. Accordingly, the logical operations making up the alternatives described herein are referred to variously as operations, steps, objects, or modules.

It should be understood that logical operations described and claimed herein might be performed in any order, unless explicitly claimed otherwise or unless a specific order is inherently necessitated by the claim language.

The above specification, examples and data provide a complete description of the structure and use of exemplary implementations of the methodologies and/or systems hereof. Since many implementations hereof can be made without departing from the spirit and scope of the invention, the invention resides in the claims hereinafter appended. Furthermore, structural features of the different embodiments may be combined in yet another embodiment without departing from the recited claims.

What is claimed is:

1. A computerized method of evaluating connectivity between two network resources, the method comprising:
   identifying possible paths of connectivity between resources of devices in the network;
   obtaining device connectivity configuration information from the devices in the network;
   aggregating and attributing the device configuration information of each device in the network to at least one of the identified possible paths of connectivity, wherein the device is in the at least one possible path in the network; and
   computing, based on the device connectivity configuration information attributed to each possible path, whether a network connectivity condition is fulfilled for each possible path between the two network resources,
   wherein the two network resources include one or more of LUNs, ports or applications.

2. The method of claim 1 wherein the ports include one or more of storage array ports, switch ports, and host ports.

3. A computerized method of evaluating connectivity between two network resources, the method comprising:
   identifying possible paths of connectivity between resources of devices in the network;
   obtaining device connectivity configuration information from the devices in the network;
   aggregating and attributing the device configuration information of each device in the network to at least one of the identified possible paths of connectivity, wherein the device is in the at least one possible path in the network; and
   computing, based on the device connectivity configuration information attributed to each possible path, whether a network connectivity condition is fulfilled for each possible path between the two network resources,
   wherein the network connectivity condition is in the form of one of an affirmative, a negative, a conditional affirmative and a conditional negative.

4. A computerized method of evaluating connectivity between two network resources, the method comprising:
   identifying possible paths of connectivity between resources of devices in the network;
   obtaining device connectivity configuration information from the devices in the network;
   aggregating and attributing the device configuration information of each device in the network to at least one of the identified possible paths of connectivity, wherein the device is in the at least one possible path in the network; and
   computing, based on the device connectivity configuration information attributed to each possible path, whether a network connectivity condition is fulfilled for each possible path between the two network resources,
   wherein the one or more networked devices include a storage array and a host, and wherein the connectivity condition is between the storage array and the host, and includes masked state information indicating a property of the storage array relative to the host.

5. The method of claim 4 wherein the property of the storage array is a definition of whether a logical unit number is associated with a port of the host.

6. The method of claim 4 wherein the property is a definition of whether a port of one of the storage array and the host is associated with a respective port of the other of the storage array and the host.

7. The method of claim 4 wherein the property of the storage array is a definition of whether one or more host ports are associated with a port of the storage array.

8. The method of claim 4 wherein the property of the storage array is a definition of whether one or more logical unit numbers and one or more host ports are associated with a port of the storage array.

9. A computerized method of evaluating connectivity between two network resources, the method comprising:
identifying possible paths of connectivity between resources of devices in the network;
obtaining device connectivity configuration information from the devices in the network;
aggregating and attributing the device configuration information of each device in the network to at least one of the identified possible paths of connectivity, wherein the device is in the at least one possible path in the network; and
computing, based on the device connectivity configuration information attributed to each possible path, whether a network connectivity condition is fulfilled for each possible path between the two network resources,
wherein the one or more networked devices include a storage array and a host, and
wherein the connectivity condition is between the storage array and the host and
includes binding state information indicating a property of the storage array relative to one or more ports of the storage array.

10. The method of claim 9 wherein the property of the storage array is a definition of whether a logical unit number is associated with a port of the storage array.

11. A computerized method of evaluating connectivity between two network resources, the method comprising:
identifying possible paths of connectivity between resources of devices in the network;
obtaining device connectivity configuration information from the devices in the network;
aggregating and attributing the device configuration information of each device in the network to at least one of the identified possible paths of connectivity, wherein the device is in the at least one possible path in the network; and
computing, based on the device connectivity configuration information attributed to each possible path, whether a network connectivity condition is fulfilled for each possible path between the two network resources,
wherein the one or more networked devices include a storage array and a host, and
wherein the connectivity condition is between the storage array and the host and includes zoning state information indicating a property of the relationship of the storage array and the host.

12. A computerized method of evaluating connectivity between two network resources, the method comprising:
identifying possible paths of connectivity between resources of devices in the network;
obtaining device connectivity configuration information from the devices in the network;
aggregating and attributing the device configuration information of each device in the network to at least one of the identified possible paths of connectivity, wherein the device is in the at least one possible path in the network; and
computing, based on the device connectivity configuration information attributed to each possible path, whether a network connectivity condition is fulfilled for each possible path between the two network resources,
wherein the connectivity condition includes cabling state information indicating physical connection between any two network resources.

13. A computerized method of evaluating connectivity between two network resources, the method comprising:
identifying possible paths of connectivity between resources of devices in the network;
obtaining device connectivity configuration information from the devices in the network;
aggregating and attributing the device configuration information of each device in the network to at least one of the identified possible paths of connectivity, wherein the device is in the at least one possible path in the network; and
computing, based on the device connectivity configuration information attributed to each possible path, whether a network connectivity condition is fulfilled for each possible path between the two network resources,
wherein the connectivity condition includes link state information indicating a wireless connection between any two network resources.

14. A computerized method of evaluating connectivity between two network resources, the method comprising:
identifying possible paths of connectivity between resources of devices in the network;
obtaining device connectivity configuration information from the devices in the network;
aggregating and attributing the device configuration information of each device in the network to at least one of the identified possible paths of connectivity, wherein the device is in the at least one possible path in the network;
computing, based on the device connectivity configuration information attributed to each possible path, whether a network connectivity condition is fulfilled for each possible path between the two network resources;
determining two or more connectivity conditions, and wherein the act of determining two or more connectivity conditions comprises determining whether a first of two or more connectivity conditions is consistent with a second of the two or more connectivity conditions; and
in response to determining that the first connectivity condition is inconsistent with the second connectivity condition, causing the first connectivity condition to be displayed as a conditional connectivity condition.

15. A computerized method of evaluating connectivity between two network resources, the method comprising:
identifying possible paths of connectivity between resources of devices in the network;
obtaining device connectivity configuration information from the devices in the network;
aggregating and attributing the device configuration information of each device in the network to at least one of the identified possible paths of connectivity, wherein the device is in the at least one possible path in the network;

computing, based on the device connectivity configuration information attributed to each possible path, whether a network connectivity condition is fulfilled for each possible path between the two network resources; and providing a display of one or both of the device connectivity configuration information and the connectivity condition.

16. The method of claim 15 further comprising:

enabling the user to select a details control;

in response to the user selection of the details control, displaying the connectivity condition information for every possible path between two of the resources.

17. A computerized method of evaluating connectivity between two network resources, the method comprising:

identifying possible paths of connectivity between resources of devices in the network;

obtaining device connectivity configuration information from the devices in the network;

aggregating and attributing the device configuration information of each device in the network to at least one of the identified possible paths of connectivity, wherein the device is in the at least one possible path in the network;

computing, based on the device connectivity configuration information attributed to each possible path, whether a network connectivity condition is fulfilled for each possible path between the two network resources;

presenting a list of objects on a first side of a network;

presenting a list of objects on a second side of the network;

enabling a user to select one or more objects from the first list and one or more objects from the second list;

in response to the user selection, determining one or more connectivity conditions that exist between the user-selected objects; and displaying the connectivity conditions in a manner that associates the connectivity conditions with the user-selected objects.

18. The method of claim 17 wherein the presenting of objects on the first and second sides of the network further comprises presenting both the first list and the second list on a unified user interface screen.

19. The method of claim 17 wherein the act of presenting a list of objects on a first side of the network comprises:

enabling the user to select one or more physical devices from a plurality of network-connected physical devices, wherein the list of objects on the first side of the network that is presented to the user comprise only objects from the user-selected physical storage devices.

20. The method of claim 17 wherein the act of presenting a list of objects on a second side of the network comprises:

enabling the user to select one or more host computers or other devices from a plurality of network-connected host computers or other devices, wherein the list of objects on the second side of the network that is presented to the user comprise only objects associated with the user-selected host computers, or other devices.

21. A user interface for a network management computer program, the user interface comprising:

a first display region presenting a list of objects on a first side of the network;

a second display region presenting a list of objects on a second side of the network;

an interactive control enabling a user to select one or more objects from the first list and one or more objects from the second list;

display update processes that are responsive to the user selection and operate to determine one or more connectivity states that exist between the user-selected objects and display the determined connectivity states in a manner that associates the connectivity states with the user-selected objects.

22. A user interface for a SAN management computer program, the user interface comprising:

a first display region presenting a list of objects on a first side of the SAN;

a second display region presenting a list of objects on a second side of the SAN;

an interactive control enabling a user to select one or more objects from the first list and one or more objects from the second list;

display update processes that are responsive to the user selection and operate to determine one or more connectivity states that exist between the user-selected objects and display the determined connectivity states in a manner that associates the connectivity states with the user-selected objects.

* * * * *

UNITED STATES PATENT AND TRADEMARK OFFICE
CERTIFICATE OF CORRECTION

PATENT NO.       : 7,609,654 B2                                     Page 1 of 1
APPLICATION NO. : 11/171578
DATED            : October 27, 2009
INVENTOR(S)      : Lubeck et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1082 days.

Signed and Sealed this

Fourteenth Day of December, 2010

David J. Kappos
*Director of the United States Patent and Trademark Office*